United States Patent Office 3,832,301
Patented Aug. 27, 1974

3,832,301
POLYMERIC SOLVENT COMPOUNDS FOR CHANGING THE SALT CONCENTRATION OF WATER
Leon Lazare, Stamford, Conn., and Stephen Z. Jakabhazy, Weston, Mass., assignors to Standard Oil Company, Chicago, Ill.
No Drawing. Filed Sept. 22, 1972, Ser. No. 291,233
Int. Cl. B01d 11/00
U.S. Cl. 210—21                             9 Claims

ABSTRACT OF THE DISCLOSURE

Novel polymeric solvent compounds and their use for changing the salt concentration of water are herein described.

SUMMARY OF THE INVENTION

This invention relates to new polymeric solvent compounds which are useful in changing the salt concentration of aqueous solutions and, more particularly, to low-molecular-weight polymers containing oxygen in their backbone whose aqueous solutions show a lower critical solution temperature, and which, at higher temperatures than said critical temperature, separate into a coexisting polymer-rich aqueous phase and a polymer-impoverished aqueous phase.

In accordance with the instant invention, novel low-molecular-weight, water soluble polymers (the terms polymer and polymeric are used throughout in the general sense which includes copolymers, terpolymers etc., whether random, block or terminal block) have been made which dissolve water to yield solutions of moderate viscosity which show lower critical solution temperatures. An aqueous salt solution of such a polymer at temperatures above the critical solution temperature separates into a polymer-rich phase containing water reduced in salt concentration and a polymer-impoverished aqueous phase. The polymer-rich phase, if raised in temperature, becomes increasingly polymer-rich, generally changing from about 50 to 60 volume percent polymer to about 80 to 90 volume percent polymer between about 25° C. and about 90° C.

BACKGROUND OF THE INVENTION

U.S. Pat. 3,386,913 describes a method for changing the salt concentration of water by what in one aspect is a solvent extraction process. Said patent utilizes the ability of certain polymeric substances to show lower or upper critical solution temperatures. The success of the method therein described depends upon finding economical compounds whose aqueous solutions, inter alia, are stable, take a minor part of the salt into the polymer-rich phase, have lower or upper critical solution temperatures, become extremely insoluble in salt water at temperatures not too far above ambient, and exhibit moderate viscosities even at high concentrations and ambient temperatures. Polymeric compounds of low molecular weight appear to be ideally suited for use as polymeric solvent compounds.

A group of such polymeric solvent compounds has been disclosed in the above cited patent. But the polymeric solvent compounds therein described have one or more undesirable properties; in particular, too high aqueous solution viscosities which has led to further work to optimize the combination of properties needed for the successful application of the method therein described. Now, new polymeric solvent compounds have been found which optimize the combination of desirable characteristics required, in particular, polymers have been found which exhibit the moderate aqueous solution vicosities and the other properties needed for large scale application of the method.

STATEMENT OF THE INVENTION

The monomers found useful in making the polymeric solvent compounds of this invention are those which contain oxygen and which when polymerized put oxygen into the backbone of the polymer. Generally, polymers made from ethylene oxide, propylene oxide, 1,2-epoxybutane, 2,3-epoxybutane, styrene oxide, epifluorohydrin, epichlorohydrin, epibromohydrin, N-(2,3-epoxypropyl)pyrrolidone, dioxolane, trioxane, oxetane, tetrahydrofuran, and glycidyl ethers of the formula

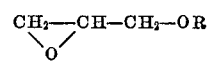

wherein R is the hydrogen, methyl, ethyl, propyl, isopropyl, phenyl or benzyl radical are useful. More preferably, polymers made from ethylene oxide, propylene oxide, 1,2-epoxybutane, 2,3-epoxybutane, styrene oxide, epifluorohydrin, epichlorohydrin, tetrahydrofuran, oxetane, dioxolane, trioxane and glycidyl ethers of the formula

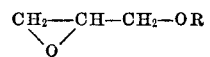

wherein R is the hydrogen, methyl, ethyl, propyl, isopropyl or phenyl radical are useful. Most preferably, a polymer made from glycidol, ethyl glycidyl ether and phenyl glycidyl ether is used.

The preferred polymeric solvent compounds are generally copolymers, terpolymers etc. as it has been found generally that the unique combination of properties required is not found in a polymeric solvent compound prepared from a single monomer. In addition, it has been found generally that preparation methods leading to largely random insertion of the component monomers in the polymer chain are preferred. However, polymeric solvent compounds containing more than a single monomer which contain blocks of homopolymer are also encompassed within the purview of the instant invention.

It has been found that to achieve the required balance of properties required for the polymeric solvent compounds that it is necessary to fix the molecular weight of the polymeric solvent compound in the range of about 800 to about 20,000 and, more preferably, in the range of about 1,000 to about 5,000.

In the separation steps involved in using compounds of the instant invention, for example, wherein a solution of the instant polymeric solvent compounds is separated from an aqueous phase, it is preferred to have the specific gravity of the solution of the polymeric solvent compound as different from that of the aqueous phase as possible. It is to be emphasized here that it is immaterial which of the two phases to be separated is denser, it only being required that a difference in specific gravity exists. A difference of about 0.03 or larger is useful and, more preferably, a difference of about 0.1 unit or larger is employed.

While the invention is described in connection with the specific Examples below, is to be understood that these are for illustrative purposes only. Many alternatives, modifications and variations will be apparent to those skilled in the art in the light of the below Examples and such alternatives, modifications and variations fall within the scope and spirit of the appended claims.

GENERAL METHOD OF PREPARATION

In a typical preparation of the polymeric solvent compounds, the monomers are combined in the desired proportions and mixed thoroughly The calculated amount of catalyst, a 48 percent aqueous solution of fluoroboric acid, is added to the reaction vessel which is cooled in an ice bath. During the reaction, nitrogen is swept through the reaction vessel and the mixture is stirred with a mechanical stirrer. The mixed monomer feed is added from an addition funnel to the catalyst in the reaction vessel. The rate of addition of the monomer feed is such that the temperature of the exothermic polymerization reaction does not exceed a given level. Generally, for preparation of 10 moles, the time of addition is 1 to 2 hours, and the temperature of the reaction mixture is in the range of 40° C. to 70° C. After addition of the monomer feed is completed, the reaction mixture is stirred for approximately 15 minutes and left to stand for 1 to 2 hours. The reaction mixture (a clear colorless, viscous solution) is then poured into an approximately equal volume of water. The calculated amount of sodium hydroxide necessary to neutralize the acid catalyst is added to the aqueous polymer solution.

The mixture is heated to 85–90° C., and the aqueous phase is separated while the mixture is hot. Additional water is added to the polymer phase and the mixture again heated to 85–90° C. and the separation made. The washing is repeated using approximately one-half the volume of water used initially. After the final separation, the polymer phase is heated until it becomes clear (water is boiled off). The amount of water remaining in the polymer phase is determined and the yield of polymer calculated based on the weight of monomer feed.

The results of a number of runs are shown below in the Tables. The abbreviations used are: EO—ethylene oxide; G—glycidol; EGE—ethyl glycidyl ether; PGE—phenyl glycidyl ether; D—1,3-dioxolane, BO—1,2-butylene oxide; PO—propylene oxide. Since the mole percent of monomer incorporated into any polymer below is not necessarily the starting amount, the starting amount (Monomer Feed) and the amount found using a nuclear magnetic resonance analytical method on the polymer as formed (Polymer Composition) are both tabulated where the latter is known.

In the Tables below K is the distribution constant used to measure the reduction of salt concentration in the polymer-rich phase. It is, of course, dependent upon temperature and the polymer concentration and is defined as the ratio of the salt concentration in the aqueous phase divided by the salt concentration in the polymer-rich phase.

TABLE I.—COPOLYMERS

| Polymer composition (mole percent) | | Monomer feed (mole percent) | | Catalyst (mole percent) | Yield (percent) | Specific gravity [a] | Viscosity (centistokes) [b] | | Distribution coefficient [c] K |
|---|---|---|---|---|---|---|---|---|---|
| G | EGE | G | EGE | | | | 70 | 90 | |
| 29.7 | 70.3 | 25.0 | 75.0 | 0.95 | 78 | | | | 6.0 |
| | | G | BO | | | | | | |
| | | 30.0 | 70.0 | 0.75 | 91 | | | | [d] |
| | | 35.0 | 65.0 | 0.75 | 84 | 1.080 | 548.1 | 567.9 | [d] |
| | | 40.0 | 60.0 | 0.75 | 86 | 1.100 | | | [d] |
| | | EO | PGE | | | | | | |
| | | 80.0 | 20.0 | 0.51 | 77 | | | | |
| G | BO | G | BO | | | | | | |
| | | 45.0 | 55.0 | 1.00 | 85 | | | | |
| 43.4 | 56.6 | 50.0 | 50.0 | 2.00 | 47 | | | | |
| G | PO | G | PO | | | | | | |
| | | 40.0 | 60.0 | 2.00 | | | | | |
| | | 25.0 | 75.0 | 1.00 | 60 | | | | |
| 19.1 | 80.9 | 20.0 | 80.0 | 1.00 | 78 | | | | |
| D | PGE | D | PGE | | | | | | |
| | | 90.0 | 10.0 | 1.00 | 71 | | | | |
| | | 95.0 | 5.0 | 1.00 | 55 | | | | |

[a] This is a calculated specific gravity based on measurements made on 70 and 90 volume percent polymer-water solutions at 25° C.
[b] The viscosities were measured on 70 and 90 volume percent polymer-water solutions at 100° F.
[c] Values shown are extrapolated from experimental data to a $\phi$ of 70 (i.e., 70 weight percent polymer solution) at 35° C.
[d] Polymer too insoluble for reliable determination of K.

TABLE II.—TERPOLYMERS

| Polymer composition (mole percent) | | | Monomer feed (mole percent) | | | Catalyst (mole percent) | (Yield (percent) | Specific gravity [a] | Viscosity (centistokes) [b] | | Distribution coefficient [c] K |
|---|---|---|---|---|---|---|---|---|---|---|---|
| G | D | EGE | G | D | EGE | | | | 70 | 90 | |
| 27.2 | 6.4 | 66.4 | 20.0 | 25.0 | 55.0 | 0.75 | 68 | 1.120 | 78.4 | 315.5 | 6.0 |
| | | | 20.0 | 30.0 | 50.0 | 0.75 | 61 | 1.135 | | | 5.9 |
| | | | 20.0 | 35.0 | 45.0 | 0.75 | 55 | 1,145 | | | 6.8 |
| G | D | PGE | G | D | PGE | | | | | | |
| | | | 20.0 | 68.0 | 12.0 | 0.76 | 59 | | | | 6.7 |
| | | | 33.0 | 50.0 | 17.0 | 0.64 | 64 | | | | 7.5 |
| G | EGE | BO | G | EGE | BO | | | | | | |
| | | | 20.0 | 50.0 | 30.0 | 1.00 | 94 | 1.077 | 194.7 | 209.0 | |
| | | | 25.0 | 50.0 | 25.0 | 1.00 | 85 | 1.080 | | | |
| | | | 30.0 | 50.0 | 20.0 | 1.00 | 91 | 1.090 | | | |
| | | | 20.0 | 40.0 | 40.0 | 2.00 | 93 | 1.062 | | | |
| 29.4 | 32.1 | 38.5 | 25.0 | 40.0 | 35.0 | 2.00 | 91 | 1.081 | | | |
| | | | 30.0 | 40.0 | 30.0 | 2.00 | 84 | 1.080 | | | |
| G | EGE | PGE | G | EGE | PGE | | | | | | |
| 35.0 | 52.0 | 12.4 | 37.5 | 50.0 | 12.5 | 0.51 | 86 | 1.123 | | | 8.5 |
| 37.7 | 51.0 | 10.8 | 32.5 | 54.0 | 13.5 | 0.51 | 92 | | | | |
| | | | 40.0 | 50.0 | 10.0 | 1.00 | 87 | 1.180 | | | 9.0 |
| | | | 40.0 | 50.0 | 10.0 | 0.75 | 97 | 1.180 | | | 7.2 |
| | | | 40.0 | 50.0 | 10.0 | 0.50 | 87 | | | | |

See footnotes at end of table.

TABLE II—Continued

| Polymer composition (mole percent) | | | Monomer feed (mole percent) | | | Catalyst (mole percent) | (Yield percent) | Specific gravity [a] | Viscosity (centistokes) [b] | | Distribution coefficient, K |
|---|---|---|---|---|---|---|---|---|---|---|---|
| G | D | EGE | G | D | EGE | | | | 70 | 90 | |
| 43.1 | 46.8 | 10.1 | 40.0 | 50.0 | 10.0 | 0.75 | 84 | 1.158 | 128.5 | 639.8 | |
| ---- | ---- | ---- | 40.0 | 50.0 | 10.0 | 0.50 | 84 | 1.160 | | | 7.5 |
| 33.6 | 59.0 | 7.4 | 35.0 | 55.0 | 10.0 | 2.00 | 87 | 1.138 | 82.2 | 309.0 | 6.0 |
| ---- | ---- | ---- | 40.0 | 50.0 | 10.0 | 2.00 | 81 | 1.150 | | | 6.8 |

[a] This is a calculated specific gravity based on measurements made on 70 and 90 volume percent polymer-water solutions at 25° C.
[b] The viscosities were measured on 70 and 90 volume percent polymer-water solutions at 100° F.
[c] Values shown are extrapolated from experimental data to a $\phi$ of 70 (i.e., 70 weight percent polymer-water solution) at 35° C.

TABLE III.—SURFACE PROPERTIES [a]

| Monomer feed (mole percent) | | | | | | | Approximate percent water | Apparent surface tension (dynes/cm.) | Apparent interfacial tension (dynes/cm.) |
|---|---|---|---|---|---|---|---|---|---|
| G | D | EGE | BO | PGE | EO | PO | | | |
| 40.0 | | 50.0 | | 10.0 | | | 30 | 41.6 | |
| 40.0 | | 50.0 | | 10.0 | | | 29 | 41.3 | [b] 1.5 |
| 20.0 | 25.0 | 55.0 | | | | | 21 | 38.8 | |
| 20.0 | 30.0 | 50.0 | | | | | 23 | 38.2 | |
| 30.0 | | | 70.0 | | | | 11 | 38.0 | [c] 10.6 |
| 30.0 | | | | | 60.0 | | 13 | 39.2 | |
| 40.0 | | 50.0 | | | | 10.0 | 14 | 41.2 | |

[a] Measurements made at room temperature (approximately 25° C.) by the ring methods.
[b] Polymer-water phase (69-31 weight percent) in equilibrium with 3.5 percent aqueous sodium chloride solution.
[c] Polymer-water phase (84.7-15.3 weight percent) in equilibrium with 3.5 percent aqueous sodium chloride solution.

We claim:
1. In a method for reducing the salt concentration of salt-containing water comprising the steps of:
   (a) mixing such water with an aqueous solution of a polymeric solvent compound, said solvent compound being used in an amount to maintain said solution in a liquid state at all times, at a given temperature to form a liquid body having a stratum of water-enriched solvent compound solution and a stratum of salt-enriched water, and
   (b) drawing off the stratum of water-enriched solvent compound solution, and
   (c) raising the temperature thereof with respect to said given temperature whereby said water-enriched solution forms an aqueous phase substantially free of solvent compound and an enriched solvent liquid phase, and drawing off said aqueous phase, the improvement which employs a polymeric solvent compound of molecular weight between about 800 and about 20,000 selected from the group consisting of polymers of ethylene oxide, propylene oxide, 1,2-epoxybutane, 2,3-epoxybutane, styrene oxide, epifluorohydrin, epichlorohydrin, epibromohydrin, N-(2,3-epoxypropyl)-pyrrolidone, dioxolane, trioxane, oxetane, tetrahydrofuran, and glycidyl ethers of the formula

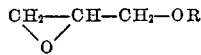

wherein R is the hydrogen, methyl, ethyl, propyl, isopropyl, phenyl or benzyl radical.

2. The method of Claim 1 wherein said stratum of salt-enriched water is drawn off and the temperature thereof raised to cause separation of any residual solvent compound solution and recovering said solvent compound solution.

3. The method of Claim 2 wherein said polymeric solvent compound has a molecular weight of from about 1,500 to about 5,000.

4. The method of Claim 1 wherein said polymeric solvent compound is selected from the group consisting of polymers of ethylene oxide, propylene oxide, 1,2-epoxybutane, 2,3-epoxybutane, styrene oxide, epifluorohydrin, epichlorohydrin, tetrahydrofuran, oxetane, dioxolane, trioxane and glycidyl ethers of the formula

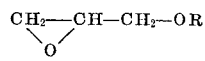

wherein R is the hydrogen, methyl, ethyl, propyl, isopropyl or phenyl radical.

5. The method of Claim 4 wherein said stratum of salt-enriched water is drawn off and the temperature thereof raised to cause separation of any residual solvent compound solution and recovering said solvent compound solution.

6. The method of Claim 5 wherein said polymeric solvent compound has a molecular weight of from about 1,500 to about 5,000.

7. The method of Claim 1 wherein said polymeric solvent compound is a polymer of glycidol, ethyl glycidyl ether and phenyl glycidyl ether.

8. The method of Claim 7 wherein said stratum of salt-enriched water is drawn off and the temperature thereof raised to cause separation of any residual solvent compound solution and recovering said solvent compound solution.

9. The method of Claim 8 wherein said solvent compound has a molecular weight of from about 1,500 to about 5,000.

References Cited
UNITED STATES PATENTS 3,386,913   6/1968   Lazare _____ 210—22

FRANK A. SPEAR, Jr., Primary Examiner

UNITED STATES PATENT OFFICE
CERTIFICATE OF CORRECTION

Patent No. 3,832,301　　　　　　　　　Dated September 22, 1972

Inventor(s) Leon Lazare - Stephen Z. Jakabhazy

It is certified that error appears in the above-identified patent and that said Letters Patent are hereby corrected as shown below:

Column 3, line 11, there is no comma after clear.

Table II, first column labeled Polymer composition (mole percent) column G; 35.0 should be 35.6.

Table II, fourth column labeled (Yield percent) reads 97. Should be 87.

Table III, column 1 labeled Monomer feed (mole percent), column G reading downwardly, second 30.0 should be 40.0.

Column 5, Table III, footnote[a] reads: methods. Should be: method.

Signed and sealed this 31st day of December 1974.

(SEAL)
Attest:

McCOY M. GIBSON JR.　　　　　　　　C. MARSHALL DANN
Attesting Officer　　　　　　　　　　Commissioner of Patents